United States Patent [19]
Kreitz

[11] 3,958,474
[45] May 25, 1976

[54] DUST COLLECTOR FOR RADIAL ARM SAWS

[76] Inventor: Lloyd D. Kreitz, P.O. Box 60, Pequot Lakes, Minn. 56472

[22] Filed: Mar. 31, 1975

[21] Appl. No.: 563,715

[52] U.S. Cl. .................... 83/100; 83/471.3
[51] Int. Cl.² ........................ B27G 3/00
[58] Field of Search .......... 83/100, 471.3; 51/273; 144/252 R

[56] References Cited
UNITED STATES PATENTS

| | | | |
|---|---|---|---|
| 2,839,102 | 6/1958 | Kido | 83/100 |
| 3,135,151 | 6/1964 | Link et al. | 83/100 X |
| 3,322,169 | 5/1967 | Hilliard | 83/100 X |
| 3,489,463 | 1/1970 | Hudson et al. | 83/100 X |

Primary Examiner—Frank T. Yost
Attorney, Agent, or Firm—Richard E. Brink

[57] ABSTRACT

Improved dust collector for radial arm saws of the type in which a generally funnel-shaped flat-bottomed hood, or shroud, is connected to a vacuum hose and positioned at the rear of the worktable. The bottom, or floor, of the shroud has a rearwardly extending slot through which a bolt is inserted to connect the hood to a spacer board of the worktable, thereby permitting the shroud to be rotated so as to align with the saw blade. A support member is positioned between the saw base and the floor to maintain the shroud in level position.

10 Claims, 4 Drawing Figures

U.S. Patent   May 25, 1976   3,958,474

DUST COLLECTOR FOR RADIAL ARM SAWS

BACKGROUND OF THE INVENTION

This invention relates to dust collectors for radial arm saws.

In recent years, radial arm saws have increased in popularity, largely because of their great versatility. This popularity has been enhanced by the development of dust collecting systems for such pieces of equipment, greatly reducing the dangerous accumulation of wood chips and air-suspended dust in the shop or home.

The first dust collector designed for radial arm saws, which is shown in my U.S. Pat. No. 3,401,724, was highly successful commercially. This dust collector comprised a funnel-shaped flat-bottomed shroud positioned at the rear of the saw worktable and arranged to be arcuately moved thereover in alignment with the saw blade. The shroud was mounted on a sheet metal support having a lip which clamped between the fence and rear table of the saw and cantilevered beyond the rearmost portion of the saw table. This support proved sowewhat difficult to install and inconvenient to use, limiting the angles at which the saw could be operated and making it inconvenient to adjust the table clamping device, which was typically positioned beneath it.

My next approach to the problem was simply to eliminate the sheet metal support member and to bolt the floor of the shroud directly to the table. While admittedly simpler, this arrangement still did not permit full rotation of the shroud to align with the saw; additionally, I found that the floor of the shroud tended to distort, permitting sawdust to escape or be packed beneath it.

SUMMARY

The present invention provides a simplified and improved form of the basic invention disclosed in my aforementioned U.S. Pat. No. 3,401,724, relying on substantially the same shroud. The improved device incorporates a rearwardly extending slot in the floor of the shroud, a bolt extending through this slot and connecting to the spacer board which forms the rearmost portion of the table. The slot is located in the floor of the shroud near the right side which is adjacent to the vertically extensible column. Surprisingly, the simple expedient of providing this slot permits the shroud to be rotated so as to maintain excellent alignment with the saw blade, no matter at what angle the saw is positioned. Specifically, the slot permits moving the shroud forward so as to be sure that it clears the vertical column in those positions where the radial arm is moved to the right.

While for many sewing situations, the arrangement just described is probably satisfactory, a simple addition to the device greatly improves its performance and accordingly is highly preferred. The improvement comprises a support member which is positioned between the top rear cross member of the saw base and the bottom of the rear portion of the shroud. Desirably this support member clips on the cross member and is vertically adjustable to accommodate various table thicknesses and saw base dimensions.

BRIEF DESCRIPTION OF THE DRAWING

The invention will be better understood by referring to the accompanying drawing, in which like numbers refer to like parts in the several views and in which.

DESCRIPTION OF PRESENTLY PREFERRED EMBODIMENTS

Figure 1:
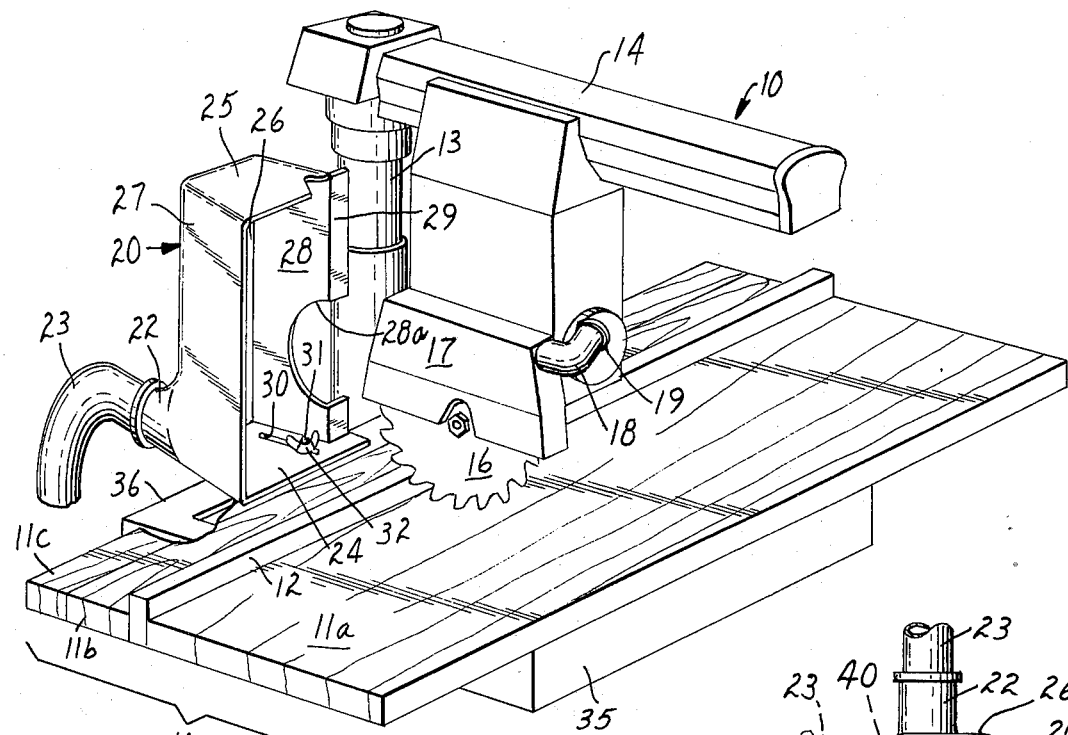
FIG. 1 is a perspective view of a radial arm saw showing the presently preferred embodiment of the improved dust collector in position, with a portion of the saw table broken away for purposes of clarity.

In the drawings, radial arm saw assembly 10 comprises worktable 11, made up of front table 11a and back table 11b, between which is positioned rip fence 12. Spacer board 11c is located at the back of rear table 11b, and clamps (not shown) drawn the subparts of worktable 11 and rip fence 12 snugly together. Worktable 11 is supported by saw base 35, which also supports extensible column 13, located at the rear of worktable. Extending horizontally from the top of column 13 is radial arm 14, which is capable of rotating through 360°, but which is generally positioned over the top of worktable 11. Mounted on arm 14, so as to move therealong, is saw carriage 15, including rotary saw blade 16 and guard 17. Extendng from guard 17 is discharge elbow 18, which I prefer to provide with a cap 19 during normal operations, removing cap 19 and connecting elbow 18 to a vacuum hose during ripping operations (when saw carriage 15 is held in fixed position, with blade 16 parallel to rip fence 12). With the exception of cap 19 and the attachment of vacuum hose to elbow 19, the entire assembly 10, as just described, comprises conventional equipment and forms no part of my invention per se.

Positioned over the rearmost portion of worktable 11 is generally funnel-shaped shroud 20, having a wide inlet opening 21 and a narrow outlet opening 22, hose 23 of a conventional home shop vacuum cleaner (not shown) being desirably connected to outlet 22 to insure the more effective removal of sawdust directed in hood 20.

Shroud 20 comprises flat bottom 24, top 25, rear wall 26, left side wall 27 and right side wall 28. Flange 29 extends from the forward portion of right side wall 28 to a position in front of vertical column 13, so as to avoid leaving a crack through which sawdust might otherwise pass. Side wall 28 is desirably modified by removing a portion at the leading edge to provide clearance area 28a, thereby permitting saw bladde 16 to be positioned in other than a vertical attitude and make full stroke bevel cuts without harming shroud 20.

Figure 2:
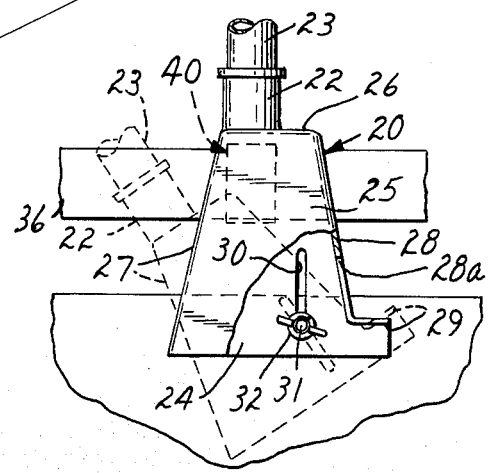
FIG. 2 is a top view of the dust collector of the invention, with certain parts broken away to facilitate understanding of the construction and with the dust collector also shown in dashed lines to indicate the manner in which it rotates.
Figure 3:
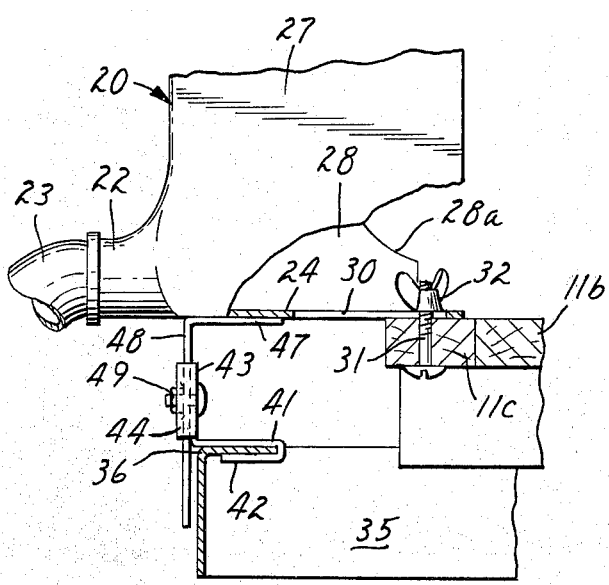
FIG. 3 is a partial side elevation view of the dust collector of the invention, showing the manner in which it is mounted, again with certain parts broken away to facilitate understanding.
Figure 4:
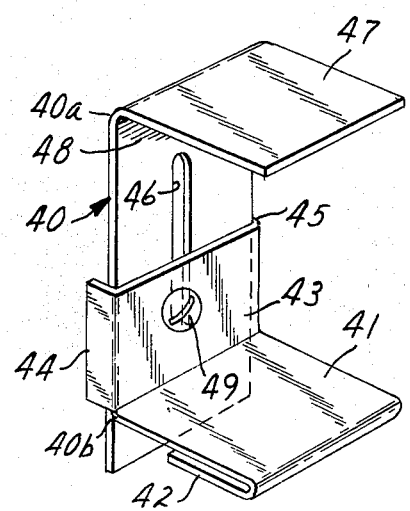
FIG. 4 is a perspective view of the support member of the invention.

Located in floor 24 of shroud 20, adjacent to right side wall 28, is slot 30, extending from front to rear, preferably at a slight angle of 8°–10° to the left of a line drawn perpendicular to rip fence 12. Extending upward through spacer board 11c and thence through slot 30 is carriage bolt 31, on the end of which is threaded thumb screw 32. In normal operation, shroud 20 is aligned with saw blades 16 and thumb screw 32 tightened to hold floor 24 snugly in contact with spacer board 11c. When the angle of radial arm 14 is changed, thumb screw 32 is loosened, hood 20 moved either forward or backward by sliding slot 30 along carriage bolt 31, rotating shroud 20 to the desired angle, and retightening thumb screw 32. For an indication of how this adjustment takes place, attention is particularly directed to FIG. 2 of the drawing.

Except for those situations where radial arm 14 is moved to the right and shroud 20 aligned with blade 16, the greatest portion of shroud 20 is cantilevered rearwardly of spacer board 11c. In such circumstances, the weight of the rear portion of shroud 20 and hose 23 tends to lift up the front edge of floor 24 and/or cause it to distort. There is then also a tendency for sawdust to be packed under the front edge of floor 24, making it more difficult to rotate shroud 20 and reducing the overall efficiency of dust collection. To prevent such undesirable occurrences, I interpose, between the rear portion of the lower surface of floor 24 and the upper surface of rear member 36 of saw base 35, shroud support 40, which is preferably adjustable vertically to compensate for different constructions of saw base and different thicknesses of worktable 11. Since saw base 35 is ordinarily provided with means for leveling worktable 11, the vertical adjustability of shroud support 40 is highly desirable.

Shroud support 40 comprises upper member 40a, having horizontal hood-supporting portion 47 and vertical portion 48, and lower member 40b, having a horizontal portion 41 and a vertical portion 43. Lower member 40b is adapted to mount on upper rear cross bar 36 of saw base 35; since cross bar 36 is typically formed of channel iron, it has been found convenient to double a distal portion 42 of horizontal portion 41 back on itself to form a clip which will slide over the edge of cross bar 36.

Vertical portion 48 of upper member 40a is provided with slot 46, bolt and nut assembly 49 passing through slot 46, through an aligned hole in vertical portion 43 of lower member 40b, and holding the upper and lower members 40a, 40b at the appropriate position. In order to prevent lateral distortion, vertical portion 43 of lower member 40b is provided with left and right flanges 44, 45, vertical portion 48 of upper member 40a fitting snugly therebetween. Some radial arm saws employ a saw base which is formed of three members assembled in triangular arrangement, one apex of the triangle being at the saw column, to which the converging members are bolted. For such saw bases, it is useful to employ only upper member 40a to support shroud 20, bolting member 40a to the saw base and adjusting it vertically to the desired height. When shroud support 40 has the configuration just described, it is readily mountable on at least twelve models of the three most popular radial arm saws.

It will be apparent that the foregoing description represents only the presently preferred embodiment of the invention, and numerous variations will readily occur to those having ordinary skill in the art. Accordingly, the invention is defined only by the appended claims, with full reference to the doctrine of equivalents.

I claim:

1. In combination with a radial arm saw assembly comprising a saw base, a vertical column positioned within the perimeter of said base at the rear thereof, a horizontal worktable positioned on said base in front of said column, said worktable including a front table and a rear table separated by a rip fence, a spacer board located at the back of said rear table, a horizontal arm rotatably attached to the upper end of said column so as to be positioned over said worktable, a rotary saw protected by a saw guard carried by said arm, a dust collector positioned at the rear of said worktable to the left of said column, said collector comprising a generally flat-bottomed funnel-shaped shroud having a wide inlet which opens toward the front of said worktable and a narrow outlet for connection to a vacuum hose, said inlet being positioned entirely above the plane of said worktable, said shroud being arcuately movable, the improvement which comprises the floor of said shroud having a slot extending generally rearwardly, a bolt extending through both said slot and said spacer board to hold the bottom of the shroud in contact with the top of the spacer board, whereby said shroud can be slid forward or backward and rotated about said bolt over the spacer board and rear table to align the outlet of the shroud with the direction of saw rotation.

2. The combination of claim 1 wherein the slot is located nearer the right side of the shroud than the left side of the shroud.

3. The combination of claim 2 wherein the slot extends left at a slight acute angle to a line drawn perpendicular to the rear of the worktable.

4. The combination of claim 1 wherein the rear portion of said shroud is supported by a support member resting on the saw base.

5. The combination of claim 4 wherein the vertical dimension of the support member is adjustable to permit positioning the upper surface of the support member in the same plane as the top of the worktable.

6. The combination of claim 5 wherein the support member is generally C-shaped in profile, being formed from two L-shaped parts, each having a vertical segment and a horizontal segment, one of said parts being inverted, the vertical segments of said parts being connected with a bolt.

7. The combination of claim 6 wherein at least one of the vertical segments is provided with a vertically extending slot through which the connecting bolt passes.

8. The combination of claim 7 wherein both the lateral edges of one of said vertical segments are provided with flanges between which the other vertical segment fits, thereby helping maintain the horizontal segments parallel.

9. The combination of claim 8 wherein the lower portion of said support member is provided with a clip to facilitate attachment to and positioning on the saw base.

10. The combination of claim 1 wherein a portion is removed from the leading edge of the shroud adjacent to the saw column, thereby permitting the saw to be used in making full-stroke bevel cuts.

* * * * *